(12) United States Patent
Kang et al.

(10) Patent No.: US 8,274,369 B2
(45) Date of Patent: Sep. 25, 2012

(54) RADIO FREQUENCY IDENTIFICATION DEVICE HAVING NONVOLATILE FERROELECTRIC MEMORY

(75) Inventors: Hee Bok Kang, Chungcheongbuk-do (KR); Jin Hong An, Gyeonggi-do (KR); Suk Kyoung Hong, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1125 days.

(21) Appl. No.: 12/147,675

(22) Filed: Jun. 27, 2008

(65) Prior Publication Data

US 2009/0058616 A1 Mar. 5, 2009

(30) Foreign Application Priority Data

Aug. 31, 2007 (KR) .................... 10-2007-0088153

(51) Int. Cl.
*H04Q 5/22* (2006.01)
(52) U.S. Cl. .................... 340/10.34; 340/10.1
(58) Field of Classification Search .............. 340/10.34, 340/10.1
See application file for complete search history.

(56) References Cited

U.S. PATENT DOCUMENTS

| | | | | |
|---|---|---|---|---|
| 5,247,292 A | * | 9/1993 | Nakanishi et al. | 340/10.34 |
| 5,450,088 A | * | 9/1995 | Meier et al. | 342/51 |
| 6,369,712 B2 | * | 4/2002 | Letkomiller et al. | 340/572.1 |
| 6,685,096 B1 | * | 2/2004 | Degrauwe et al. | 235/492 |
| 6,972,662 B1 | * | 12/2005 | Ohkawa et al. | 340/10.1 |
| 6,980,084 B1 | * | 12/2005 | Yones | 340/10.34 |
| 7,436,286 B2 | * | 10/2008 | Fischer et al. | 340/10.1 |
| 7,843,316 B1 | * | 11/2010 | Khieu | 340/10.1 |
| 2002/0153997 A1 | * | 10/2002 | Nakane et al. | 340/10.34 |
| 2006/0097848 A1 | * | 5/2006 | Davidson et al. | 340/10.2 |
| 2006/0164212 A1 | * | 7/2006 | Roz et al. | 340/10.2 |

FOREIGN PATENT DOCUMENTS

| JP | 2005-235679 A | 9/2005 |
|---|---|---|
| KR | 10-0673131 B1 | 1/2007 |
| KR | 1020070074600 A | 7/2007 |

* cited by examiner

*Primary Examiner* — Jennifer Mehmood
*Assistant Examiner* — Naomi Small
(74) *Attorney, Agent, or Firm* — Ladas & Parry LLP

(57) ABSTRACT

A RFID device having a nonvolatile ferroelectric memory includes an analog block. A power-on reset unit configured to sense a power voltage and output a power sensing signal is included in the analog block. A radio frequency signal sensing unit is configured to sense the level of a detecting signal corresponding to a radio frequency signal received by the antenna of the RFID device and outputs a radio frequency sensing signal. A power-on reset mixer is configured to synthesize the power sensing signal and the radio frequency sensing signal and outputs a power-on reset signal according to the voltage levels of the power sensing signal and the radio frequency sensing signal.

22 Claims, 9 Drawing Sheets

US 8,274,369 B2

RADIO FREQUENCY IDENTIFICATION DEVICE HAVING NONVOLATILE FERROELECTRIC MEMORY

CROSS-REFERENCES TO RELATED APPLICATIONS

This application is based upon and claims the benefit of priority to Korean Patent Application No. 10-2007-0088153, filed on Aug. 31, 2007, the entire contents of which are incorporated herein by reference.

BACKGROUND OF THE INVENTION

The present invention relates generally to a Radio Frequency Identification (RFID) device having a nonvolatile ferroelectric memory, and more particularly, to an RFID device which senses the off period of a radio frequency signal regardless of the power voltage in order to generate a stabilized power-on reset signal.

The data processing speed of nonvolatile ferroelectric memory, that is, Ferroelectric Random Access Memory (FeRAM) is typically similar to that of Dynamic Random Access Memory (DRAM). However, FeRAM is different from DRAM, in that data stored in FeRAM is conserved even when the power supply of the memory device is turned off. Thus, FeRAM is quickly gaining publicity and is considered a strong candidate as a next generation memory device.

The structure of FeRAM is similar to that of DRAM, in that FeRAM includes a plurality of capacitors. However, the capacitors in a FeRAM device are made of a ferroelectric material having a high residual polarization, which in turn allows for data retention even when the power supplied to the memory device is terminated.

In a device which utilizes nonvolatile ferroelectric memory as a memory device, a system controller outputs a chip enable signal to the nonvolatile ferroelectric memory chip. In response to the chip enable signal, the memory device included in the memory chip generates a chip internal control signal for operating the memory cell of the chip. Data are read from or written to the memory cell in response to the chip internal control signal.

The device utilizing the nonvolatile ferroelectric memory reads data stored in a code register when a power source is applied to the nonvolatile ferroelectric memory in order to "set up" the data. The read operation of the code register is performed in response to a power-on reset signal.

Conventional power-on reset circuits are configured to generate a power-on reset signal using the power voltage. That is, when the power voltage is changed from off to on, the power-on reset signal is generated.

If the power voltage drops below a threshold, the power-on reset circuit recognizes the power voltage as off. In order to compensate for this problem, the power source must be stabilized, so that a level of the power voltage does not drop if an off period of the power voltage is not sufficiently long.

However, when the power voltage is changed from off to on for a short period of time, the power-on reset circuit does not generate the power-on reset signal. As a consequence, the power-on reset operation is not performed normally.

SUMMARY OF THE INVENTION

Various embodiments are directed at providing an RFID device having a nonvolatile ferroelectric memory configured to sense the off period of a radio frequency signal to generate a power-on reset signal so that the power-reset-sign is generated regardless of the power voltage level.

Various embodiments are directed at providing an RFID device having a nonvolatile ferroelectric memory that includes a capacitor having high capacity that is disposed in a power voltage receiving terminal to stabilize the power source.

According to an embodiment of the present invention, an RFID device having a nonvolatile ferroelectric memory, receiving a radio frequency signal, and generating a power voltage for driving the RFID device comprises: a power-on reset unit configured to sense the power voltage in order to output a power sensing signal; a radio frequency signal sensing unit configured to sense a voltage level of a detecting signal corresponding to the radio frequency signal, and outputting a radio frequency sensing signal according to the sensed voltage level; and a power-on reset mixer configured to receive the power sensing signal and the radio frequency sensing signal, and outputting a power-on reset signal according to the voltage levels of the power sensing signal and the radio frequency sensing signal.

DESCRIPTION OF SPECIFIC EMBODIMENTS

Figure 1:
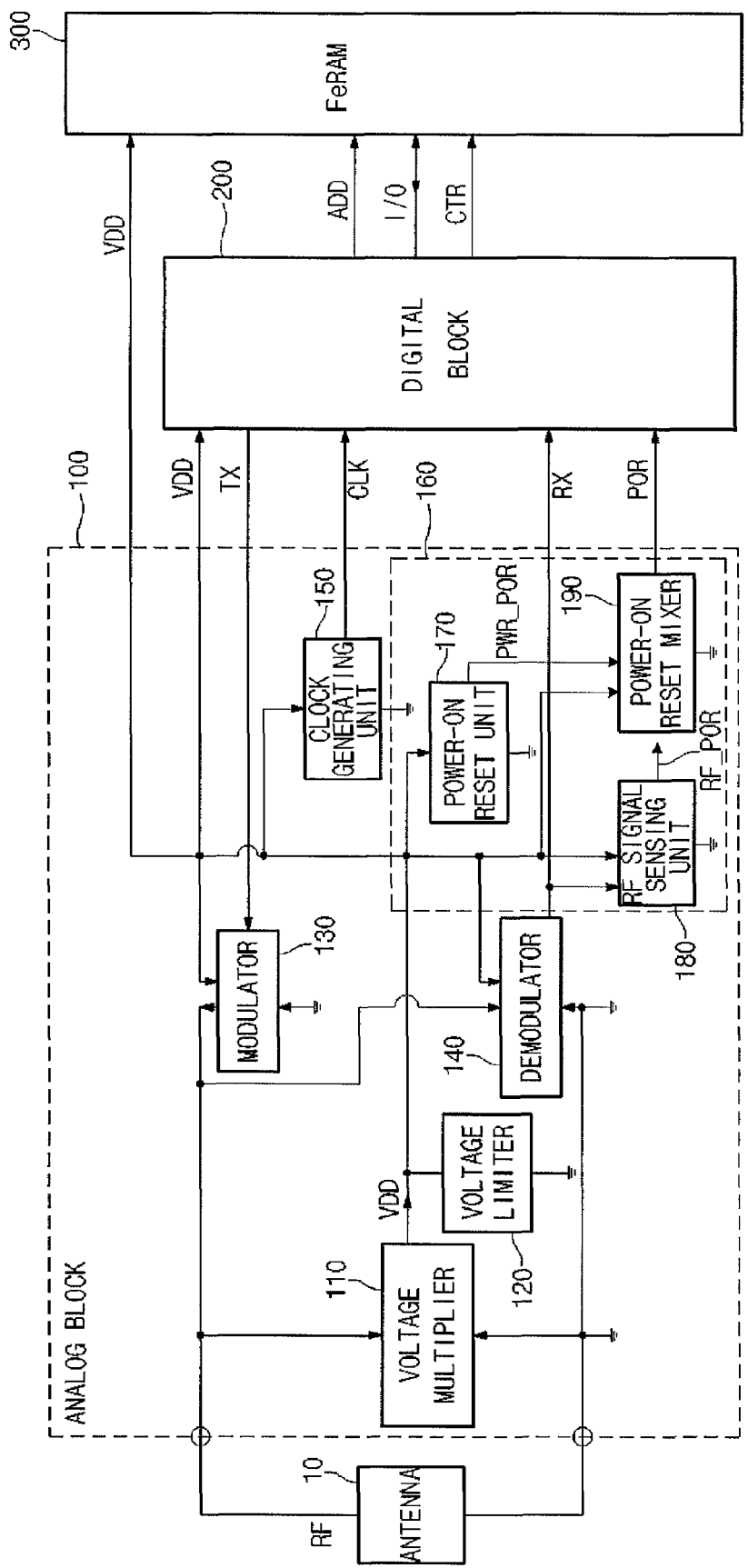
FIG. 1 is a diagram showing an RFID device having a nonvolatile ferroelectric memory according to an embodiment of the present invention.

FIG. 1 is a diagram showing an RFID device having a nonvolatile ferroelectric memory according to an embodiment of the present invention.

Referring to FIG. 1, the RFID device comprises an analog block 100, a digital block 200, and a nonvolatile FeRAM 300.

The analog block 100 a voltage multiplier 110, a voltage limiter 120, a modulator 130, a demodulator 140, a clock generating unit 150, and a sensing unit 160. The sensing unit 160 includes a power-on reset unit 170, an RF signal sensing unit 180, and a power-on reset mixer 190.

The RFID device also include an antenna 10 connected to the analog block 100. The antenna 10 transmits and receives radio frequency signals RF between an external reader or writer and the RFID device. The voltage multiplier 110 generates a power voltage VDD (which is used as the driving voltage for the RFID device) using the radio frequency signal RF received from the antenna 10. The voltage limiter 120 limits the transmission voltage of the radio frequency signal RF received from the antenna 10 and outputs the voltage to the demodulator 140, the clock generating unit 150, the power-on reset unit 170, and the power-on reset mixer 190.

The modulator 130 modulates a response signal TX received from the digital block 200 and transmits the signal to the antenna 10. The demodulator 140 demodulates the radio frequency signal RF received from the antenna 10 according to the output voltages of the voltage multiplier 110 and the voltage limiter 120 to output a detecting signal RX to the digital block 200.

The clock generating unit 150 supplies a clock signal to the digital block 200. The clock signal CLK is used to control the operation of the digital block 200, and is generated according to the output voltage VDD of the voltage multiplier 110. The power-on reset unit 170 senses the output voltage VDD of the voltage multiplier 110 to output a power sensing signal PWR_POR to the power-on reset mixer 190.

The RF signal sensing unit 180 senses the voltage level of the detecting signal RX to output an RF sensing signal RF_POR to the power-on reset mixer 190. The power-on reset mixer 190 logically combines the power sensing signal PWR_POR with the RF sensing signal RF_POR to output a power-on reset signal POR for controlling a reset operation to the digital block 200.

The digital block 200 receives the power voltage VDD, the power-on reset signal POR, the clock CLK, and the detecting signal RX, analyzes a command signal, and generates a control signal and processing signals to thereby output the information of the corresponding response signal TX to the analog block 100. The digital block 200 outputs an address ADD, input/output data I/O, and a control signal CTR to the FeRAM 300. The FeRAM 300 is a memory block configured to read/write data with nonvolatile ferroelectric capacitors.

Figure 2:
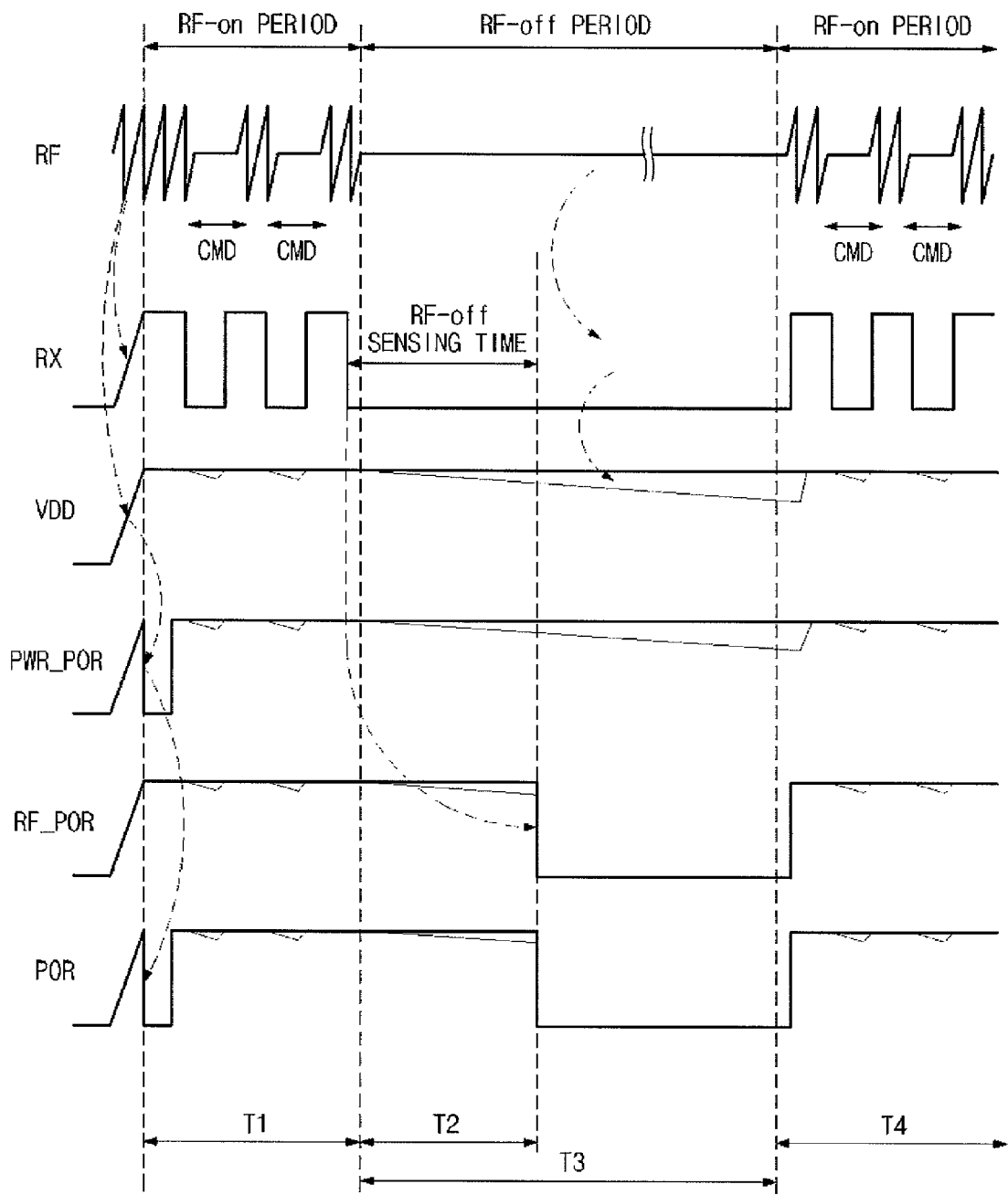
FIG. 2 is a timing diagram shown for illustrating the operation of the RFID device having a nonvolatile ferroelectric memory according to an embodiment of the present invention.

FIG. 2 is a timing diagram shown for illustrating the operation of the RFID device having a nonvolatile ferroelectric memory according to an embodiment of the present invention.

The demodulator 140 uses CMOS technology to convert the radio frequency signal RF to the outputted detecting signal RX. The detecting signal RX is outputted at a high level while the radio frequency signal RF is being applied, and the detecting signal RX is outputted at a low level while the radio frequency signal RF is not applied.

When the radio frequency signal RF maintains a level below a given threshold within a standard period of time, the radio frequency signal RF is recognized as a command signal CMD. Conversely, when the radio frequency signal RF maintains a level below a given level threshold for longer than the standard time, the radio frequency signal RF is recognized as off. The standard time describes a period of time used to distinguish a signal to be recognizes as on from a signal to be recognized as off.

The period in which the command signal CMD is processed is defined as the 'on' period (T1, T4) of the radio frequency signal RF. The period in which the command signal CMD is not processed is defined as the 'off' period (T3) of the radio frequency signal RF.

During the period in which the radio frequency signal RF is processed as the command signal, the power voltage VDD drops slightly. During the off period (T3) of the radio frequency signal RF, the power voltage VDD drops a considerable amount.

An off sensing period (T2) of the radio frequency signal RF refers to a period before the power voltage VDD drops below a 'critical voltage' in the off period (T3) of the radio frequency signal RF. The off sensing period T2 of the radio frequency signal RF is the maximum period of time after the detecting signal RX transits to a low level in which a command signal CMD can still be recognized.

The power-on reset unit 170 senses the initial power voltage VDD received from the on period (T1) of the radio frequency signal RF to generate the power sensing signal PWR_POR having a low pulse. The RF signal sensing unit 180 generates a low level RF sensing signal RF_POR after the off sensing period (T2), and before the on period (T4) (that is, during the portion of the RF-off Period in which the RF-off sensing time has passed).

The power-on reset mixer 190 generates a low level power-on reset signal POR when any one of the power sensing signal PWR_POR and the RF sensing signal RF_POR are generated at a low level.

That is, the period in which the power voltage VDD is on may be distinguished from the period in which the radio frequency signal RF is off using the power sensing signal PWR_POR and the RF sensing signal RF_POR. As a result, the off period of the radio frequency signal RF is sensed regardless of the power voltage VDD, so that a stable power-on reset signal POR can be generated.

Figure 3:
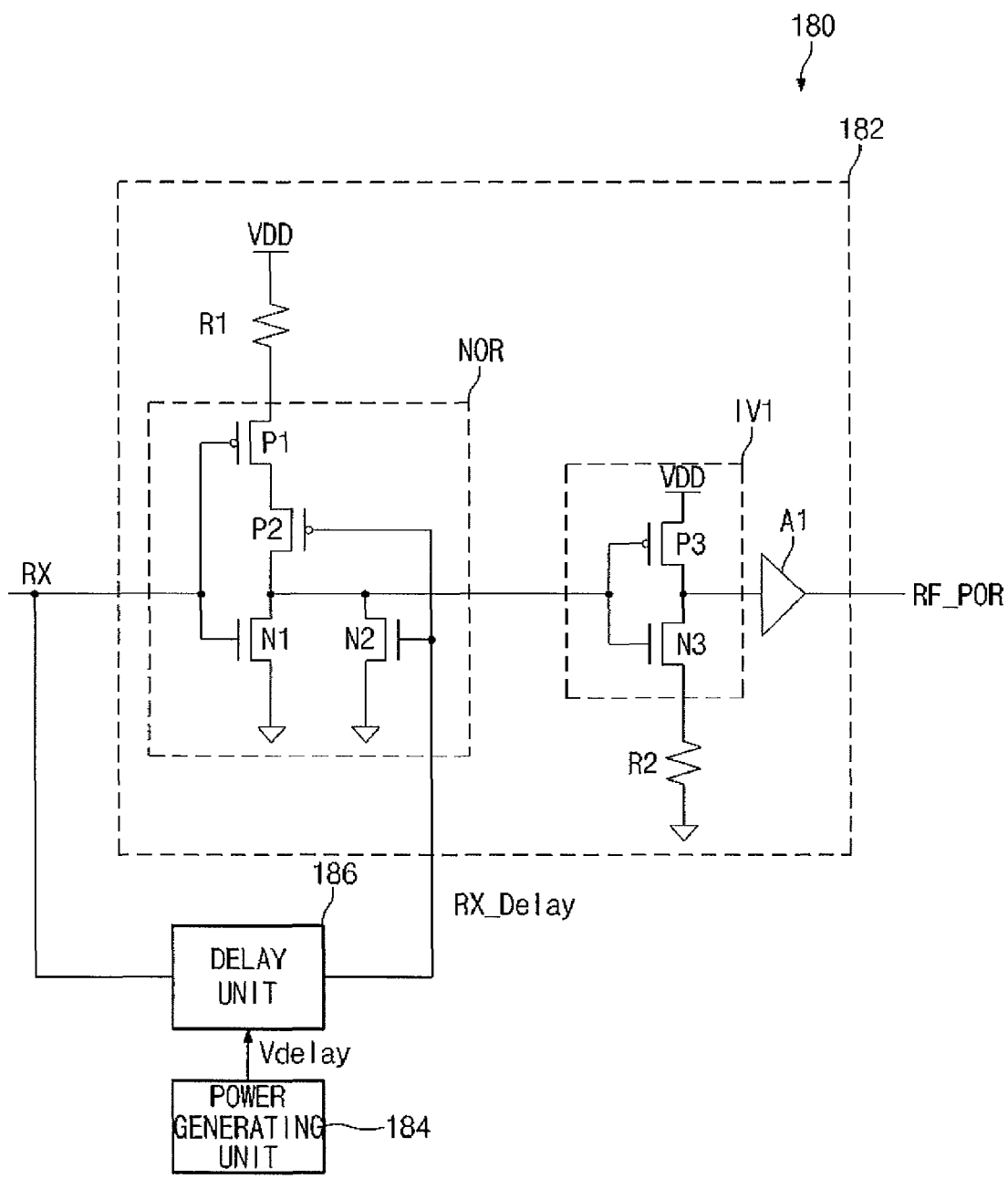
FIG. 3 is a circuit diagram showing the RF signal sensing unit of FIG. 1.

FIG. 3 is a circuit diagram showing the RF signal sensing unit 180 of FIG. 1.

The RF signal sensing unit 180 includes a RF signal generating unit 182, a power generating unit 184, and a delay unit 186.

The RF signal generating unit 182 includes current liming resistors R1, R2; a NOR gate NOR; an inverter IV1; and an operational amplifier A1. The current limiting resistor R1 is connected between a power voltage terminal and the NOR gate NOR and limits the supply current.

The current limiting resistor R2 is connected between the inverter IV1 and a ground voltage terminal and limits the supply current. The current limiting resistors R1, R2 limit the current so that a current less than 1 µA flows in the NOR gate NOR and the inverter IV1. In order to limit the current to be less that 1 µA, the resistors having a large resistance value are used.

The NOR gate NOR includes PMOS transistors P1, P2 and a NMOS transistor N1 connected in series between the ground voltage terminal and the current limiting resistor R1. The PMOS transistor P1 and the NMOS transistor N1 share a common gate which receives the detecting signal RX.

The NMOS transistor N2 is connected in parallel to the NMOS transistor N1, and the gate of the NMOS transistor is commonly connected to the gate of the PMOS transistor P2. Thus, the NMOS transistor N2 and the PMOS transistor P2 share a common gate which receives a detecting delay signal RX_Delay.

The inverter IV1 includes a PMOS transistor P3 and a NMOS transistor N3 connected in series between a power voltage terminal and the current limiting resistor R2. The PMOS transistor P3 and the NMOS transistor N3 share a common gate which receives the output signal of the NOR gate NOR. The operational amplifier A1 amplifies the output signal of the inverter IV1 in order to output the RF sensing signal RF_POR.

The power generating unit 184 adjusts for temperature and supply voltage characteristics to supply a given voltage Vdelay to the delay unit 186. The delay unit 186 delays the detecting signal RX in response to the voltage Vdelay for a given time to output the detecting delay signal RX_Delay.

Figure 4:
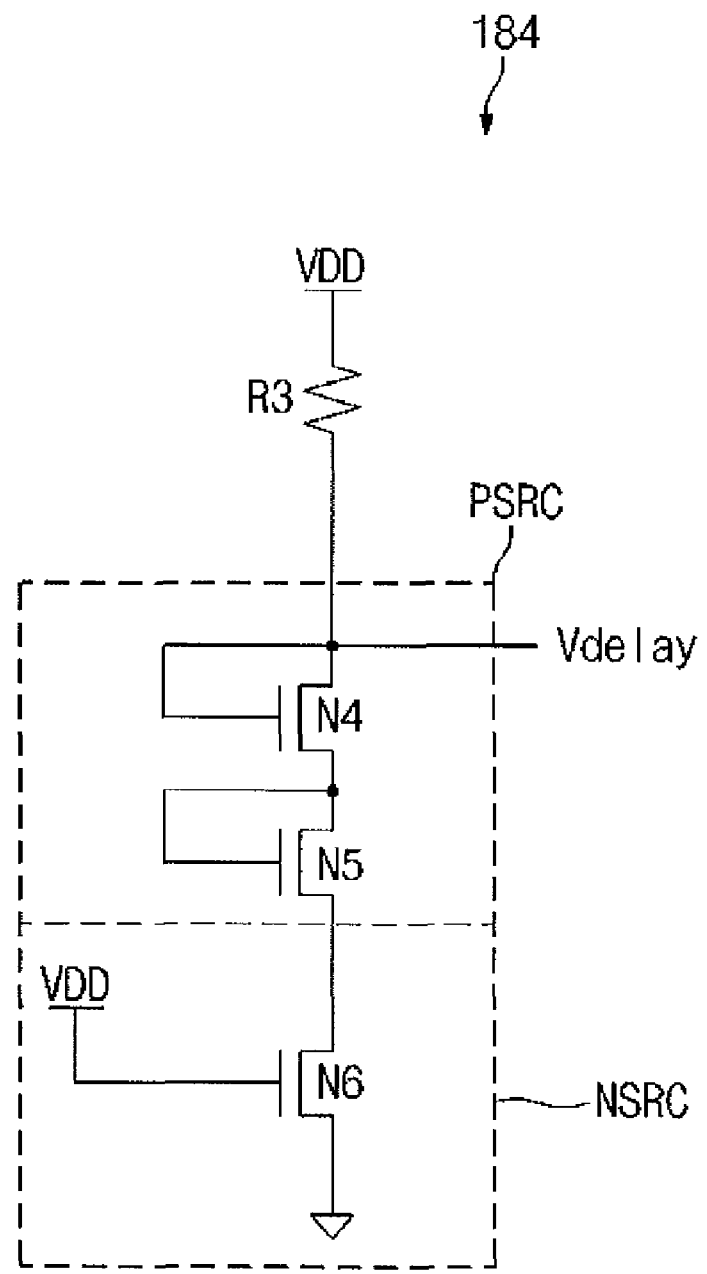
FIG. 4 is a circuit diagram showing the power generating unit of FIG. 3.

FIG. 4 is a circuit diagram showing the power generating unit 184 of FIG. 3.

The power generating unit 184 includes a current limiting resistor R3, a positive slope resistance adjusting unit PSRC, and a negative slope resistance adjusting unit NSRC.

The current limiting resistor R3 is connected between a power voltage terminal and a voltage Vdelay output terminal and limits the supply current. The positive slope resistance adjusting unit PSRC includes NMOS transistors N4, N5.

The negative slope resistance adjusting unit NSRC includes an NMOS transistor N6. The NMOS transistors N4~N6 are connected in series between the voltage Vdelay output terminal and the ground voltage terminal. Each of the NMOS transistors N4, N5 have a commonly connected gate and drain. The gate of the NMOS transistor N6 receives the power voltage VDD.

Figure 5:
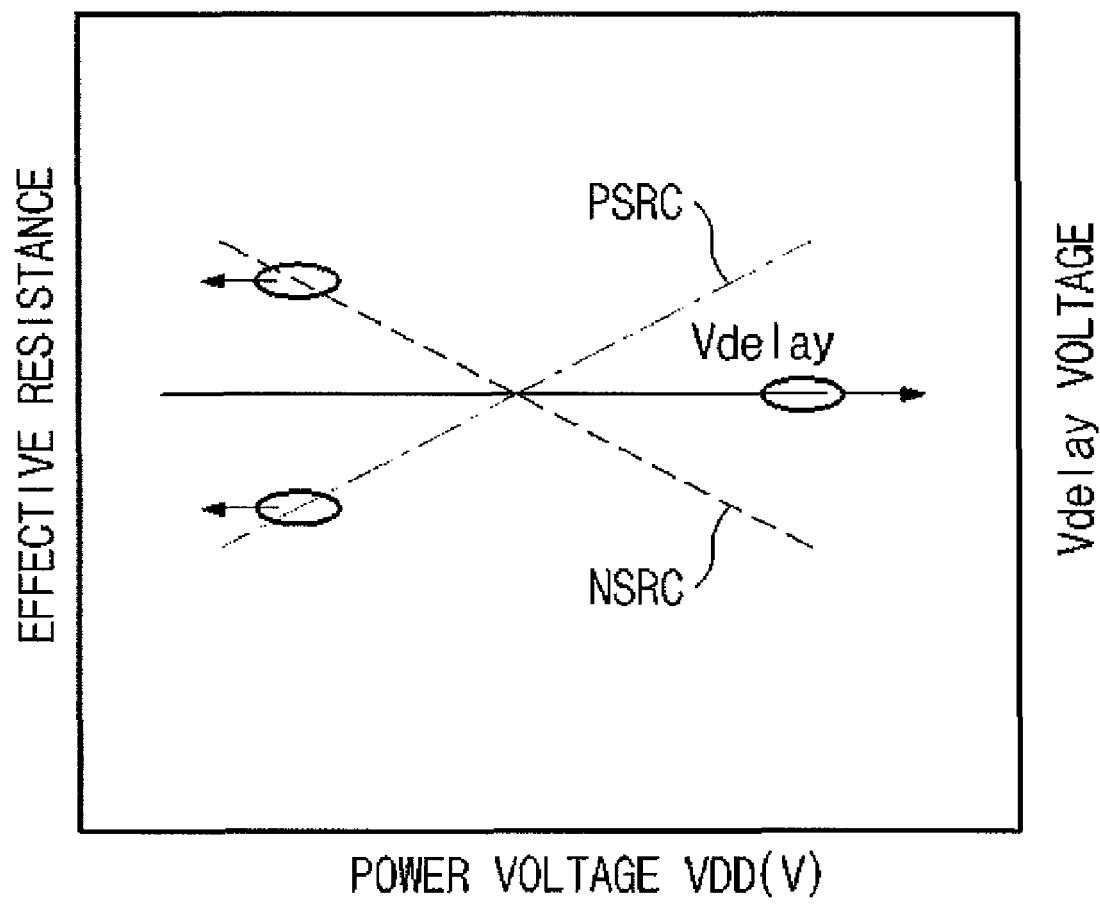
FIG. 5 is a diagram shown for illustrating the operation of the power generating unit of FIG. 4.

FIG. 5 is a diagram shown for illustrating the operation of the power generating unit 184 of FIG. 4.

In the positive slope resistance adjusting unit PSRC, the voltage of source and drain terminals of the NMOS transistors N4, N5 increases as the level of the power voltage VDD increases. As a result, the threshold voltage of the NMOS transistors N4, N5 rises to have a large voltage drop and a large effective resistance.

The NMOS transistor N6 has a source voltage fixed at a ground voltage level and a drain connected to a source of the NMOS transistor N5 of the positive slope resistance adjusting unit PSRC. The gate of the NMOS transistor N6 receives the power voltage VDD. In the negative slope resistance adjusting unit NSRC, when the level of the power voltage VDD rises the negative slope resistance adjusting unit NSRC has a small effective resistance.

The positive slope resistance adjusting unit PSRC is connected in series to the negative slope resistance adjusting unit NSRC and the two have opposite effective resistance characteristics and therefore the voltage Vdelay can be maintained at a given level.

For example, if the power voltage VDD level rises, the voltage Vdelay having the given level is outputted since an effective resistance having a positive slope characteristic is identical to that having a negative slope characteristic.

When the level of the power voltage VDD changes, the power generating unit provides adjustment so that the given voltage Vdelay is supplied to the delay unit 186 allowing the detecting signal RX to have a given delay time.

Figure 6:
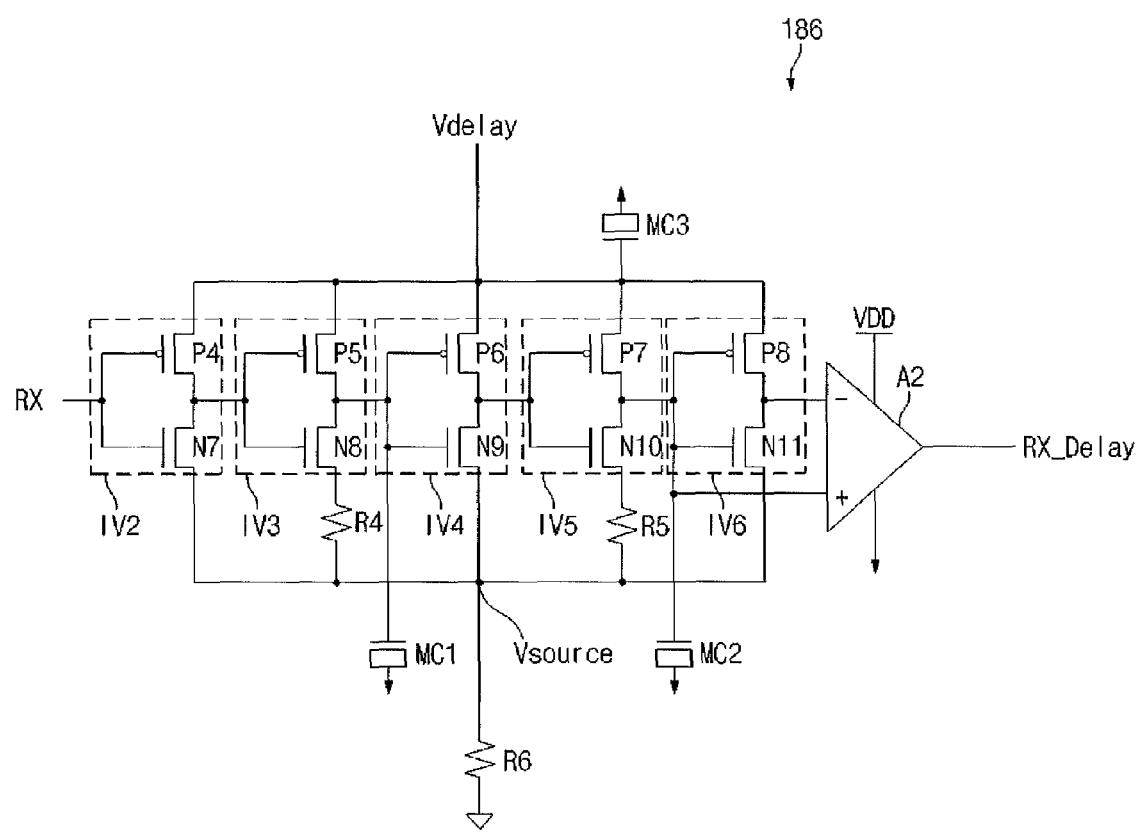
FIG. 6 is a circuit diagram showing the delay unit of FIG. 3.

FIG. 6 is a circuit diagram showing the delay unit 186 of FIG. 3.

The delay unit 186 includes an inverter chain having inverters IV2~IV6 connected in series; delay adjusting capacitors MC1, MC2; a power stabilizing capacitor MC3; delay adjusting resistors R4, R5; a current limiting resistor R6; and an operational amplifier A2.

The inverters IV2~IV6 include PMOS transistors P4~P8 and NMOS transistors N7~N11. Each of the inverters IV2~IV6 includes an NMOS PMOS pair. The gate of the inverter IV2 receives the detecting signal RX. In the inverters IV3~IV6, the output signal of the previous inverter is inputted to the subsequent inverter.

The PMOS transistors P4~P8 share a common source which receives the voltage Vdelay. The NMOS transistors N7~N11 share a common source which receives a source voltage Vsource. The current limiting resistor R6 is connected between a source voltage Vsource terminal and a ground voltage terminal.

The inverters IV3, IV5 are included in the even number blocks of the inverter chain. The inverter IV3 is connected to the delay adjusting resistor R4 for increasing the delay time of the falling edge of the output signal of the inverter IV3, and the output of the inverter IV3 is connected to the delay adjusting capacitor MC1. The inverter IV5 is connected to the delay adjusting resistor R5 for increasing the delay time of the falling edge of the output signal of the inverter IV5, and the output of the inverter IV5 is connected to the delay adjusting capacitor MC2. As such, the delay adjusting resistors R4, R5 are connected between even number inverters IV3, IV5 and the source voltage Vsource, and the delay adjusting capacitors are connected between the output terminal of the even number inverters IV3, IV5 the ground voltage terminal.

Thus, the delay adjusting resistor R4 is connected between the source of the NMOS transistor N8 and the source voltage Vsource receiving terminal. The delay adjusting resistor R5 is connected between the source of the NMOS transistor N10 and the source voltage Vsource receiving terminal.

The delay adjusting capacitor MC1 is connected between the output terminal of the inverter IV3 and the ground voltage terminal. The delay adjusting capacitor MC2 is connected between the output terminal of the inverter IV5 and the ground voltage terminal. The power stabilizing capacitor MC3 is connected between the voltage Vdelay receiving terminal and the ground voltage terminal.

negative terminal (−) of the operational amplifier A2 receives the output signal of the inverter IV6, and the positive terminal (+) receives the output signal of the inverter IV5. The operational amplifier A2 amplifies the output signal of the inverter IV6 at the power voltage VDD level to output the detecting delay signal RX_Delay.

Figure 7:
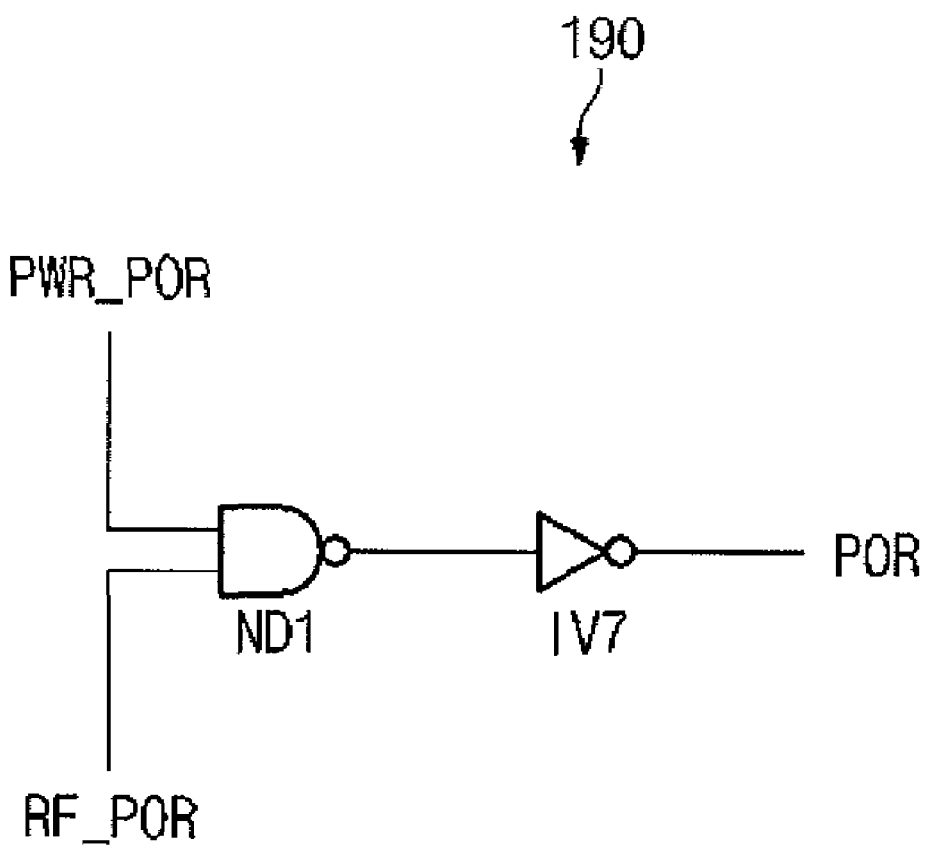
FIG. 7 is a circuit diagram showing the power-on reset mixer of FIG. 1.

FIG. 7 is a circuit diagram showing the power-on reset mixer 190 of FIG. 1.

Referring to FIG. 7, the power-on reset mixer 190 includes a NAND gate ND1 and an inverter IV7. The NAND gate ND1 performs a NAND operation on the power sensing signal PWR_POR and the RF sensing signal RF_POR. The inverter IV7 inverts the output signal of the NAND gate ND1 to output the power-on reset signal POR.

Figure 8:
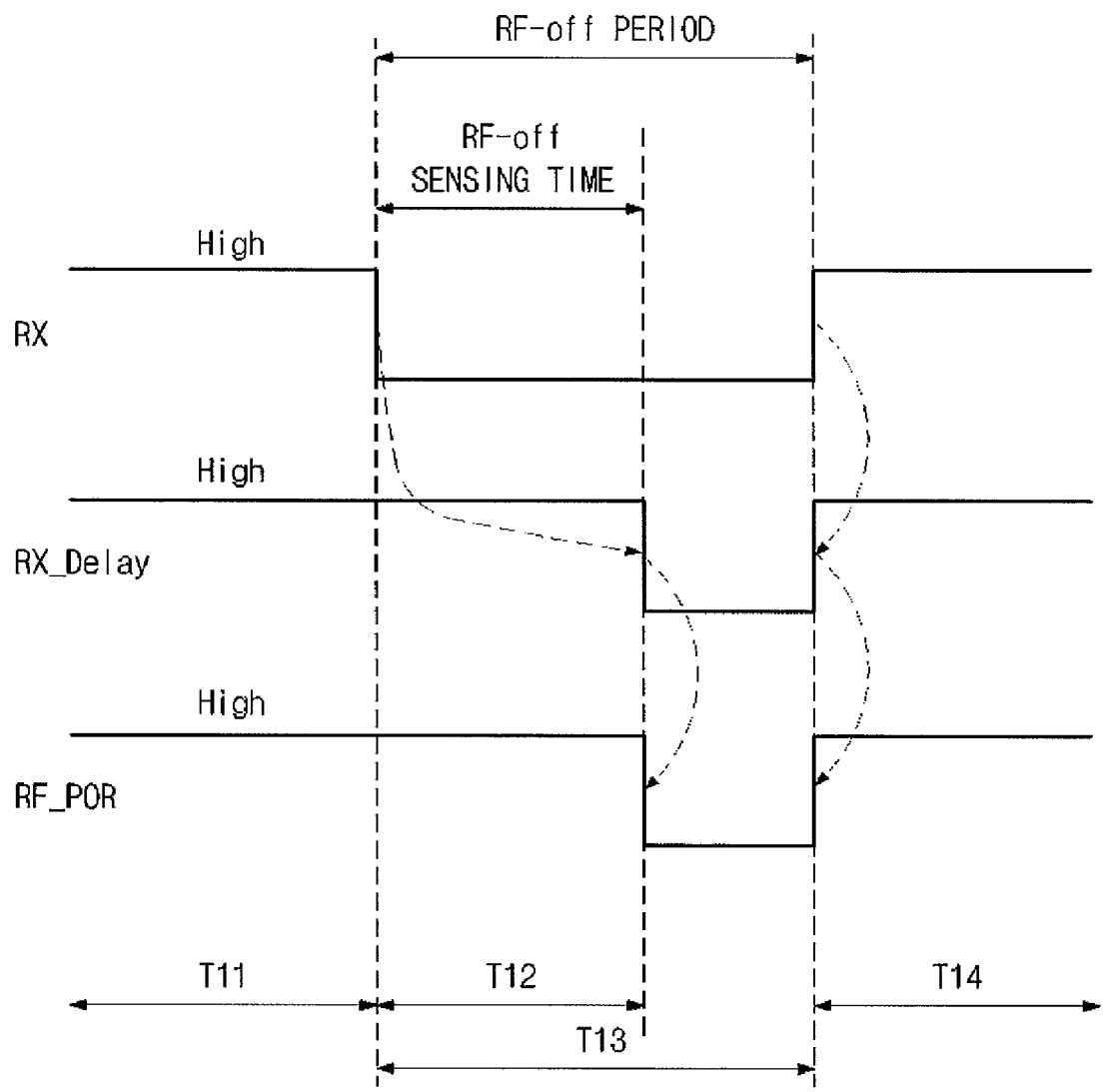
FIG. 8 is a timing diagram shown for illustrating the operation of the RF sensing unit of FIG. 1.

FIG. 8 is a timing diagram shown for illustrating the operation of the RF sensing unit 180 of FIG. 1. FIG. 8 shows an example of when an off period (T13) of the radio frequency signal RF is longer than an off sensing period (T12) of the radio frequency signal RF.

During period T11, when the radio frequency signal RF is on, the demodulator 140 outputs the detecting signal at a high level. The delay unit 186 delays the detecting signal RX for a given time to output the detecting delay signal RX_Delay having a high level. The RF signal generating unit 182 inactivates the RF sensing signal RF_POR at a high level.

During period T13, the radio frequency signal RF is off. The detecting signal RX transits from the high level to a low level. The delay unit 186 delays the detecting signal RX for the off sensing period (T12) of the radio frequency signal RF at a falling edge of the detecting signal RX to output the detecting delay signal RX_Delay.

The RF signal generating unit 182 activates the RF sensing signal RF_POR at a low level when the detecting signal RX and the detecting delay signal RX_Delay are simultaneously at a low level.

During period T14, the radio frequency signal RF is on again. The detecting signal RX transits from the low level to the high level. The delay unit 186 delays the detecting signal RX for a given time to output the detecting delay signal RX_Delay having a high level. As a result, the RF signal generating unit 182 inactivates the RF sensing signal RF_POR at a high level.

Figure 9:
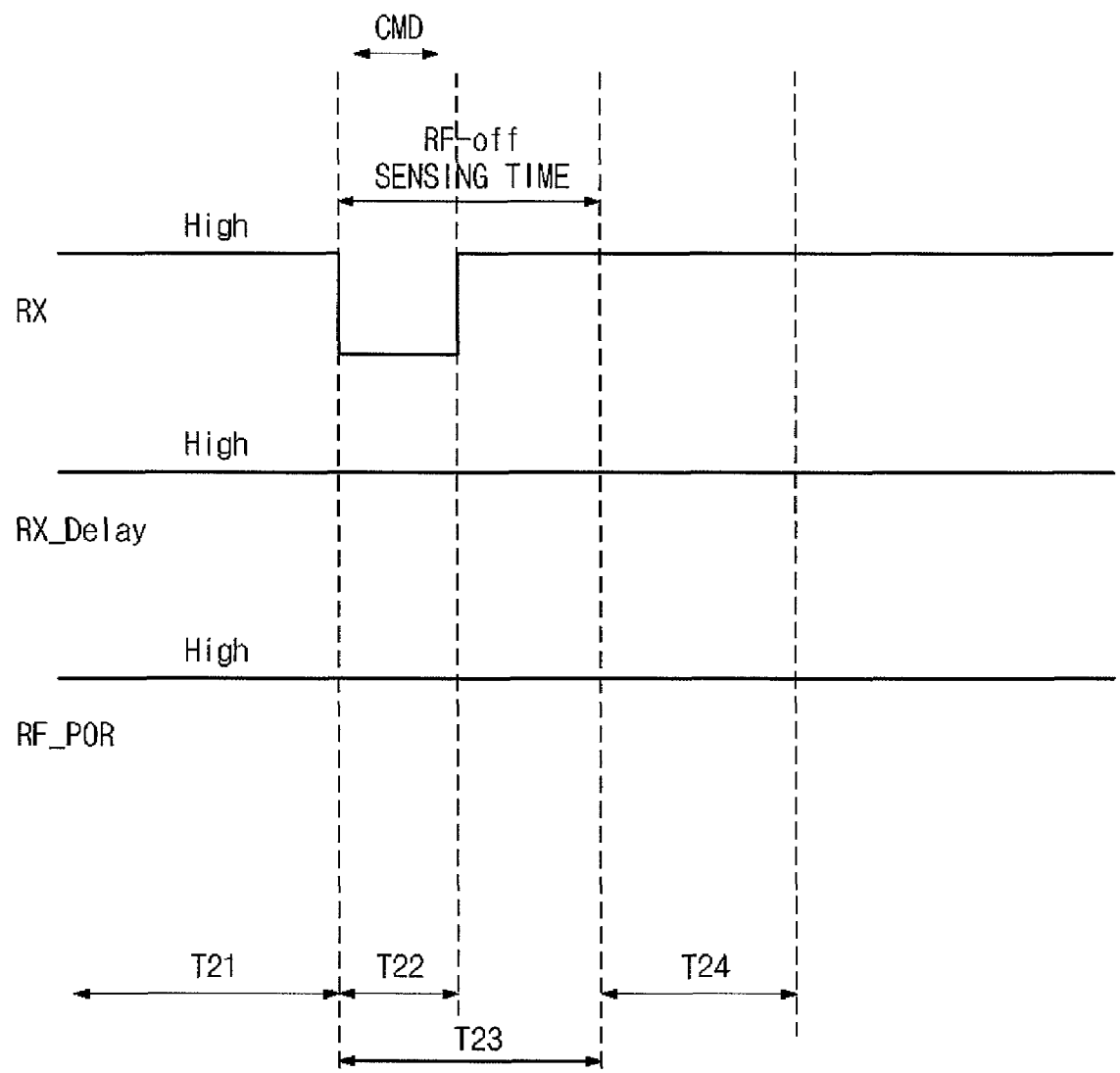
FIG. 9 is a timing diagram shown for illustrating the operation of the RF sensing unit of FIG. 1.

FIG. 9 is a timing diagram shown for illustrating the operation of the RF sensing unit 180 of FIG. 1. FIG. 9 shows an example of when a command signal CMD period (T22) is shorter than an off sensing period (T23) of the radio frequency signal RF.

During period T21, when the radio frequency signal RF is generated, the demodulator 140 outputs the detecting signal RX at a high level. The delay unit 186 delays the detecting signal RX for a given time to output the detecting delay signal RX_Delay having a high level. The RF signal generating unit 182 inactivates the RF sensing signal RF_POR at a high level.

During period T23, the radio frequency signal RF is recognized as the command signal CMD. The detecting signal RX transits from the high level to a low level. The delay unit 186 delays the falling edge of the detecting signal RX for the off sensing period (T22) of the radio frequency signal RF.

A pulse width of the detecting signal RX becomes narrower and disappeared because the time in which the detecting signal RX maintains the low level is shorter than the off sensing period (T22) of the radio frequency signal RF. As a result, the detecting delay signal RX_Delay is outputted at a high level.

As a result, the RF signal generating unit 182 inactivates the RF sensing signal RF_POR at a high level.

During period T24, the radio frequency signal RF is generated again. The detecting signal RX transits from the low level to the high level. The delay unit 186 delays the detecting signal RX for a given time to output the detecting delay signal RX_Delay having a high level. As a result, the RF signal generating unit 182 inactivates the RF sensing signal RF_POR at a high level.

That is, the RF signal sensing unit 180 maintains the inactivated RF sensing signal RF_POR while the radio frequency signal RF is recognized as a signal, and activates the RF sensing signal RF_POR while the radio frequency signal RF is recognized to be off.

As described above, according to an embodiment of the present invention, an RFID device having a nonvolatile ferroelectric memory is configured to sense the off period of a radio frequency signal to generate a power-on reset signal regardless of a power voltage.

The RFID device having a nonvolatile ferroelectric memory further comprises a capacitor of high capacity disposed in a power voltage receiving terminal to stabilize a power source.

Although a number of illustrative embodiments consistent with the invention have been described, it should be understood that numerous other modifications and embodiments can be devised by those skilled in the art that will fall within the spirit and scope of this disclosure. More particularly, a number of variations and modifications are possible in the component parts and/or arrangements that are within the scope of the disclosure, the drawings, and the appended claims. In addition to variations and modifications in the component parts and/or arrangements, alternative uses will also be apparent to those skilled in the art.

What is claimed is:

1. An RFID device having a nonvolatile ferroelectric memory, receiving a radio frequency signal, and generating a power voltage for driving the RFID device, the RFID device comprising:
a power-on reset unit configured to sense the power voltage in order to output a power sensing signal;
a demodulator configured to demodulate the radio frequency signal and outputting a detecting signal;
a radio frequency signal sensing unit configured to sense a voltage level of the detecting signal corresponding to the radio frequency signal, and outputting a radio frequency sensing signal according to the sensed voltage level; and
a power-on reset mixer configured to receive the power sensing signal and the radio frequency sensing signal, and outputting a power-on reset signal according to the voltage levels of the power sensing signal and the radio frequency sensing signal,
wherein the radio frequency signal sensing unit comprises:
a power generating unit configured to adjust an effective resistance in response to a change in the level of the power voltage in order to output a first voltage having a given level;
a delay unit configured to delay the detecting signal for a given time in response to the first voltage in order to output a detecting delay signal; and
a radio frequency signal generating unit configured to perform a logical operation on the detecting signal and the detecting delay signal in order to generate the radio frequency sensing signal.

2. The RFID device according to claim 1, wherein the radio frequency signal sensing unit senses a period in which the radio frequency signal is off.

3. The RFID device according to claim 2, wherein the radio frequency signal sensing unit is configured to output the radio frequency sensing signal such that the radio frequency sensing signal remains activated after a maximum period of time in which the detecting signal is inactivated, wherein the radio frequency signal is recognized as a signal during this maximum period of time.

4. The RFID device according to claim 1, wherein the power-on reset mixer outputs the power-on reset signal to be activated when the power sensing signal and the radio frequency sensing signal are activated.

5. The RFID device according to claim 1, wherein the delay unit comprises:
an inverter chain configured to delay the detecting signal for a given period of time in response to the first voltage and a second voltage;
a first operational amplifier configured to amplify the output signal of the inverter chain at the power voltage level in order to output the detecting delay signal; and
a delay adjusting element connected to the inverter chain and configured to increase a delay time of the falling edge of the detecting signal.

6. The RFID device according to claim 5, wherein the delay adjusting element comprises:
a plurality of delay adjusting resistors each of which is connected between a respective one of the even number inverters of the inverter chain and a second voltage receiving terminal; and
a plurality of delay adjusting capacitors each of which is connected between a respective one of the output terminals of the even number inverters and a ground voltage terminal.

7. The RFID device according to claim 5, wherein the delay unit further comprises a power stabilizing capacitor connected between the first voltage receiving terminal and the ground voltage terminal.

8. The RFID device according to claim 5, wherein the first voltage has a high level and the second voltage has a low level.

9. The RFID device according to claim 1, wherein the radio frequency signal generating unit outputs the radio frequency sensing signal to be activated when the detecting signal and the detecting delay signal are simultaneously at a low level.

10. The RFID device according to claim 1, wherein the radio frequency signal generating unit comprises:
a first logic combination element configured to perform a logical combination of the detecting signal and the detecting delay signal; and an inverter configured to invert the output signal of the first logic combination element.

11. The RFID device according to claim 10, wherein the first logic combination element is a NOR gate.

12. The RFID device according to claim 10, wherein the radio frequency signal generating unit further comprises a second operational amplifier configured to amplify the output signal of the inverter in order to output the radio frequency sensing signal.

13. The RFID device according to claim 10, wherein the radio frequency signal generating unit further comprises a second current limiting resistor connected between a power voltage receiving terminal and the first logic combination element.

14. The RFID device according to claim 10, wherein the radio frequency signal generating unit further comprises a third current limiting resistor connected between the inverter and the ground voltage terminal.

15. The RFID device according to claim 1, wherein the power generating unit comprises:
 a positive slope resistance adjusting unit configured to increase a first effective resistance when the voltage level of the power voltage rises; and
 a negative slope resistance adjusting unit configured to decrease a second effective resistance when the voltage level of the power voltage rises.

16. The RFID device according to claim 15, wherein the positive slope resistance adjusting unit comprises a plurality of MOS transistors connected in series between a first voltage output terminal and the negative slope resistance adjusting unit.

17. The RFID device according to claim 16, wherein the plurality of MOS transistors are NMOS transistors, and each NMOS transistor has a commonly connected gate and drain.

18. The RFID device according to claim 15, wherein the negative slope resistance adjusting unit comprises a MOS transistor connected between the positive slope resistance adjusting unit and the ground voltage terminal, wherein a gate of the MOS transistor receives the power voltage.

19. The RFID device according to claim 18, wherein the MOS transistor is a NMOS transistor.

20. The RFID device according to claim 15, wherein the power generating unit further comprises a fourth current limiting resistor connected between the power voltage receiving terminal and the positive slope resistance adjusting unit.

21. The RFID device according to claim 1, wherein the power-on reset mixer comprises:
 a second logic combination element configured to perform a logical combination of the power sensing signal and the radio frequency sensing signal; and
 an inverter configured to invert an output signal of the second logic combination element.

22. The RFID device according to claim 21, wherein the second logic combination element is a NAND gate.

* * * * *